United States Patent [19]

Gambardella

[11] 3,709,966

[45] Jan. 9, 1973

[54] COMPRESSION OF LAYERS OF POLYURETHANE FOAM CONTAINING AT LEAST ALTERNATE LAYERS OF PARTIALLY CURED FOAM

[75] Inventor: Mario A. Gambardella, Milford, Conn.

[73] Assignee: Olin Corporation, New Haven, Conn.

[22] Filed: Aug. 19, 1970

[21] Appl. No.: 65,326

Related U.S. Application Data

[63] Continuation-in-part of Ser. No. 732,848, May 29, 1968, abandoned.

[52] U.S. Cl. ............... 264/46, 161/159, 161/190, 260/2.5 BD, 264/248, 264/251, 264/321
[51] Int. Cl. .................................................. B29d 27/00
[58] Field of Search.....264/321, 46, 54, 55, 248, 251

[56] References Cited

UNITED STATES PATENTS

| | | | |
|---|---|---|---|
| 3,125,617 | 3/1964 | Hoppe | 264/54 |
| 2,878,153 | 3/1959 | Hacklander | 264/46 |
| 3,400,196 | 9/1968 | LeRoy | 264/288 X |
| 3,506,600 | 4/1970 | Zocco | 264/321 X |
| 3,012,283 | 12/1961 | Foster | 264/54 X |
| 3,060,137 | 10/1962 | Gemeinhardt | 264/321 X |
| 3,056,168 | 10/1962 | Terry | 264/54 X |
| 3,464,872 | 9/1969 | Everett | 264/46 X |
| 2,845,997 | 8/1958 | Waite | 264/46 X |
| 3,291,873 | 12/1966 | Eakin | 264/55 X |

FOREIGN PATENTS OR APPLICATIONS

| | | | |
|---|---|---|---|
| 682,371 | 3/1964 | Canada | 264/321 |
| 586,508 | 11/1959 | Canada | 264/46 |

*Primary Examiner*—Donald J. Arnold
*Assistant Examiner*—Paul A. Leipold
*Attorney*—F. A. Iskander, Gordon D. Byrkit, Donald F. Clements, Thomas P. O'Day and E. Zagarella, Jr.

[57] ABSTRACT

Polyurethane foam composites characterized by at least one layer of flexible, densified polyurethane foam are prepared by placing a plurality of layers of polyurethane foam, including at least alternate layers of partially cured polyurethane foam, in contiguous relationship, thereby forming a composite structure, maintaining the composite for a critical period of time at a critical environmental temperature, applying a compressive force to the composite to reduce its volume by between about two-thirds and one-tenth of its original volume, removing the compressive force and completeing the cure. These polyurethane foam composites are particularly useful for cushioning applications. The partially cured polyurethane foam bonds to adjacent layers during the process.

12 Claims, No Drawings

COMPRESSION OF LAYERS OF POLYURETHANE FOAM CONTAINING AT LEAST ALTERNATE LAYERS OF PARTIALLY CURED FOAM

This application is a continuation-in-part of co-pending application Ser. No. 732,848, filed May 29, 1968 and now abandoned.

This invention relates to a process for preparing polyurethane foam composites and to products produced thereby. More particularly, this invention relates to a process for preparing polyurethane foam composites characterized by at least one layer of flexible, densified polyurethane foam.

Various laminated polyurethane foams have been previously disclosed in the literature. Thus, U.S. Pat. No. 3,050,432 discloses compression of a plurality of webs of foam material with heat and under pressure to produce a laminated structure pervious to air and water vapor. In addition to requiring the use of heat, thin layers of foam must be employed to insure bonding between the layers. While the products produced thereby are suitable for use in specialized applications such as clothing, they are impractical for such uses as cushions and bedding because of their thin layers and cumbersome processing requirements.

Another welding technique is disclosed in U.S. Pat. No. 2,878,153, wherein layers of foam are attached to one another by welding around the periphery of the composite structure. Thus, the various layers of the structure are secured to one another only at the outside edges, and therefore the process is applicable only to the preparation of finished products; i.e., the production of stock to be cut to size at a later period is precluded.

The use of adhesives to secure layers of polyurethane foam to each other is also known in the art, but this technique requires additional materials and manufacturing steps, and thus is uneconomical and commercially unattractive.

Now it has been found that superior polyurethane foam composites can be made in accordance with the process of this invention. Briefly, the invention comprises placing a plurality of pieces of polyurethane foam, with the proviso that at least alternating pieces are of partially cured polyurethane foam, as defined hereinafter, in contiguous relationship, and compressing the resulting composite under selected, critical conditions, the direction of the compressive force being substantially perpendicular to the boundary lines between the pieces of foam. The process of this invention is advantageous in that heating and the use of secondary materials such as adhesives are avoided. Furthermore, superior bonding at the interfaces of the layers is achieved, and composites having strata of various densities can be produced.

The selected process conditions for compressing the composite of this invention are fully described in U.S. Pat. 3,506,600 to Natale C. Zocco and Stanley I. Cohen entitled "Polyurethane Foams Having Increased Density and Process Therefor," which issued Apr. 14, 1970; and the entire disclosure of this patent is herewith incorporated by reference in its entirety.

Briefly, the aforementioned patent describes a process for preparing densified polyurethane foams which comprises allowing a polyurethane foam-forming reaction mixture to rise, thereby forming a partially cured cellular material; maintaining the partially cured cellular material for a critical period of time at a critical environmental temperature and applying a compressive force to the partially cured cellular material to reduce its volume by a specified amount.

The resulting polyurethane foams are characterized by superior physical properties, and are suitable for a variety of applications, as is more fully described in the aforementioned patent application. However, by employing the process of the present invention, products having a plurality of layers of varying densities can be provided for specialized cushioning applications. Such products can be tailored to widely diverse specifications, and this flexibility enhances their commercial attractiveness.

More in detail, the process which the present invention employs, as disclosed in U.S. Pat. No. 3,506,600, comprises applying a compressive force to a partially cured polyurethane foam at any time after completion of the rise of the foam, as indicated by the appearance of bubbles on the surface of the foam, up to about 10 minutes thereafter.

During the period of time which elapses between the completion of the rise of the uncured foam and the application of pressure, referred to hereinafter as the "crush time," the partially cured cellular material is maintained within a critical environmental temperature range. Thus, where the crush time is between about 0 and about 2.5 minutes, temperatures between about 45° and about 400° F., and preferably between about 45° and about 200° F., are employed. Narrower temperature ranges are utilized where the partially cured cellular material is maintained for a longer crush time. Thus, where the time interval is between about 2.5 and about 5 minutes, temperatures between about 45° and about 200° F., and preferably between about 45° and 100° F., are maintained, while temperatures between about 45° and 110° F., and preferably between about 45° and about 85° F., are employed wherein about 5 to about 10 minutes elapse before the application of a compressive force to the partially cured cellular material.

Conventional means, such as ovens and cooling systems, are employed, if necessary, to provide the desired temperatures.

In commercial operations, it is particularly preferred to operate under environmental conditions, and thus temperatures from about 70° to about 110° F. are employed therein while maintaining any crush time within the broad range of 0 to 10 minutes.

At the end of the crush time, the partially cured polyurethane foam is compressed by any suitable compressive means, such as rollers, platens, and the like, to between about two-thirds and one-tenth of its original thickness after rise. The desired degree of compression is achieved by adjusting the opening in the compressive means.

In accordance with the process of the present invention, a plurality of pieces or layers of polyurethane foam, including at least alternate pieces or layers of partially cured polyurethane foam, as defined hereinafter, are placed in contiguous relationship to form a composite structure. Applying the aforementioned process variables, the composite foam is then subjected to compression, the direction of which is substantially perpendicular to the boundary lines between the layers or pieces of foam. It is to be understood that the numerical limitations of those process variables, such as crush time, deflection, etc., apply only to the layer or layers of partially cured polyurethane foam.

By the term "layers of polyurethane foam," as used in the claims and specification herein, is meant layers or bodies of any type of polyurethane foam, such as cured, rigid polyurethane foam; cured, flexible polyurethane foam; partially cured, flexible polyurethane foam; partially cured, densified polyurethane foam prepared as described in U.S. Pat. No. 3,506,000; cured, densified polyurethane foam; polyurethane foam-forming reaction mixtures as is more fully described hereinafter, etc. Of course, layers comprising several different types of foams can be used.

By the term "in contiguous relationship," as used in the specification and claims herein, is meant any arrangement of the pieces or layers of foam whereby every two pieces or layers have a common area of direct contact between them and all such areas of contact in the composite foam are along a substantially common axis. Thus the term encompasses placing two layers of foam one on top of the other, placing two pieces of foam in side-by-side contact, or making a sandwich of three or more pieces or layers of foam arranged on top of one another or in side-by-side contact.

By the term "at least alternate pieces or layers of partially cured polyurethane foam," as used in the specification and claims herein, it is meant that at least every other piece or layer is of partially cured polyurethane foam. Thus if the composite consists of two layers, at least one of these layers is of partially cured polyurethane foam; if the composite consists of three layers, then at least the middle layer is of partially cured polyurethane foam; and if the composite consists of four or more layers then at least the first, third, fifth etc., or at least the second, fourth, sixth etc. layers, are of partially cured polyurethane foam.

The term "partially cured polyurethane foam" employed in the claims and specification herein is meant to include any material to which the process variables of the aforementioned U.S. Pat. No. 3,506,600 could be employed. Thus, any partially cured polyurethane foam which has not been held more than 10 minutes after completion of its rise, is within the purview of this definition.

According to the teaching of this invention, several process embodiments are feasible. The following examples are intended to illustrate those embodiments, but should not be construed as limiting the invention.

A. Allow two or more polyurethane foam-forming reaction mixtures to rise separately, then place the partially cured polyurethane foams together and crush;

B. Separately crush two or more partially cured polyurethane foams, place them together and crush the composite;

C. Crush and then cure a partially cured polyurethane foam, crush a second partially cured polyurethane foam, place the two foams together and crush the composite;

D. Crush a partially cured polyurethane foam, form a composite with a cured free-rise, i.e., conventional non-densified polyurethane foam, and crush the composite;

E. Place a partially cured polyurethane foam in contiguous relationship with a cured free-rise polyurethane foam and crush the composite;

F. Crush and cure a partially cured polyurethane foam, place in contiguous relationship with a partially cured free-rise polyurethane foam and crush the composite;

G. Pour a polyurethane foam-forming reaction mixture onto a cured free-rise polyurethane foam and crush the composite;

H. Pour a polyurethane foam-forming reaction mixture onto a crushed, partially cured polyurethane foam and crush the composite; and I. Pour a polyurethane foam-forming reaction mixture onto a cured, crushed polyurethane foam and crush the composite.

While excellent polyurethane foam composites can be prepared by any of the above-listed techniques, preferred embodiments comprise the process set forth above in A).

It is to be understood that the techniques and processes described in the previously cited U.S. Pat. No. 3,506,600 are employed in carrying out the crushing operations referred to in the aforementioned paragraph.

After the polyurethane foam has been subjected to compression, the compressive force is removed and curing is completed. While curing can be accelerated by the application of heat, such treatment is not generally necessary since the foam will completely cure under ambient conditions. Thus, it will be recognized that completion of the cure can be effected simultaneous with, or subsequent to, the removal of the compressive force, and with or without the use of elevated temperatures, and that any one of these combinations is encompassed by the procedural step referred to in the description and in the claims herein as "removing the compressive force and completing the cure of the composite polyurethane foam."

After removal of the compressive force and completion of the cure, the layer or layers of densified foam may recover a small portion of the difference between their initial height and the crushing gap, the degree of recovery depending upon the particular process variables. Of course, since the foam has been densified it is apparent that it never completely regains its original dimensions.

In the preparation of the polyurethane foam composites of this invention either the so-called "once-shot method" or the "semi-prepolymer technique" ("quasi-prepolymer" technique) may be employed. Any combinations of polyols, including polyether polyols and polyester polyols, organic polyisocyanate, foaming agent catalyst and other reactants capable of forming a flexible urethane foam can be employed in carrying out the process of this invention, and the terms "polyurethane foam-forming reaction mixture," "polyurethane foam," and "partially cured polyurethane foam" in the specification and claims herein is meant to include any such combination. Typical formulations are described in U.S. Pat. No. 3,072,582, issued Jan. 8, 1963 and Canadian Pat. No. 705,938, issued Mar. 16, 1965.

While, as indicated above, both polyether and polyester polyols can be employed in the practice of this invention, preferred embodiments utilize the polyether polyols in the preparation of the polyurethane foamlforming reaction mixture. To further illustrate suitable formulations, the polyether polyols, useful for the preparation of the polyurethane material of this invention, include oxyalkylated polyhydric alcohols having a molecular weight in the range between about 700 and about 10,000 and preferably between about 1,000 and 6,000. The hydroxyl number of the polyether polyol is generally less than about 250 preferably in the range between about 25 and about 175. These oxyalkylated polyhydric alcohols are generally prepared by reacting in the presence of an alkaline catalyst, a polyhydric alcohol and an alkylene oxide, such as ethylene oxide, propylene oxide, butylene oxide, amylene oxide, epichlorohydrin, and mixtures of these alkylene oxides, by either random addition or step-wise addition.

Polyhydric alcohols suitable for use in preparing the polyether polyol include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, mixtures thereof and the like. If desired, a portion of all of the polyhydric alcohol may be replaced with another compound having at least two reactive hydrogen atoms, such as alkyl amines, alkylene polyamines, cyclicamines, amides, and polycarboxylic acids. Suitable alkyl amines and alkylene polyamines include methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides, such as acetamide, succinamide and benzenesulfonamide, constitute a further class of such reactive hydrogen compounds. A still further class of such reactive hydrogen compounds is the di- and polycarboxylic acids, such as adipic acid, succinic acid, glutaric acid, aconotic acid, diglycollic acid, and the like. It will be recognized that the reactive hydrogen compound can be one containing different functional groups having reactive hydrogen atoms, such as citric acid, glycollic acid, ethanolamine, and the like. Aromatic polyamines such as toluene diamine can also be employed.

The organic polyisocyanates used in the preparation of the polyurethane foam composites of this invention include toluene diisocyanate, such as the 4:1 mixture or the 65:35 mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene-1,5-diisocyanate, polyphenylene polymethylene isocyanate, mixtures thereof and the like. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, preferably between about 0.9 and about 1.15 NCO groups per hydroxyl group. The ratio of NCO to OH groups times 100 is referred to as the "index."

The polyurethane foams and partially cured polyurethane foams are prepared in the presence of a foaming agent, reaction catalysts, and preferably a small proportion of a conventional surfactant. The foaming agent employed may be any of those known to be useful for this purpose, such as water, as well as organic foaming agents containing up to about seven carbon atoms such as the halogenated hydrocarbons, lower molecular weight alkanes, alkenes, ethers, and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. The amount of foaming agent employed may be varied within a wide range. Generally, however, the halogenated hydrocarbons are employed in an amount from about 1 to 50 parts by weight per 100 parts by weight of the polyol, and generally water is employed in an amount from about 1.0 to 6.0 parts by weight per 100 parts by weight of the polyol.

The polyurethane foams and partially cured polyurethane foams are prepared in the presence of a catalytic amount of a reaction catalyst. The catalyst employed may be any of the catalysts known to be useful for this purpose, or mixtures thereof, including tertiary amines and metallic salts, particularly stannous salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalysts may be employed. Preferably, a mixture of amine and metallic salt is employed as the catalyst. The catalyst or catalyst mixture, as the case may be, is usually employed in an amount ranging between about 0.05 and about 1.5, and preferably between about 0.075 and about 0.50 percent by weight of the polyol.

It is preferred in the preparation of the polyurethane compounds of the present invention to employ minor amounts of a conventional surfactant in order to further improve the cell structure of the polyurethane foam. Typical of such surfactants are the silicone oils and soaps, and the siloxaneoxyalkylene block copolymers. U.S. Pat. No. 2,834,748, issued May 13, 1958 to Donald L. Bailey et al., discloses various siloxanes which are useful for this purpose. Generally up to 2 parts by weight of the surfactant is employed per 100 parts of the polyol.

Various additives can be employed which serve to provide different properties, e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

The polyurethane foam composites of this invention can be prepared batchwise or in a continuous operation. An illustrative batch process comprises feeding the foam-forming ingredients into a conventional box, allowing the foam to complete the rise thereby forming a partially cured cellular block, removing the partially cured cellular block from the box, placing it in contact with another block of cellular polyurethane, and applying a compressive force to the composite foam. The application of the compression must be effected within the crush time specified above and while maintaining an environmental temperature within the range specified above, and the direction of the compression must be substantially perpendicular to the boundary line between the two blocks of foam.

An exemplificative continuous process comprises admixing the foam-forming ingredients in a suitable mixing head and feeding the resulting mixture to a moving conveyor having suitable side retaining means to contain the liquid reactants. As the reaction proceeds while moving along the conveyor, bubbles form in the reaction mixture, which effects a volume increase and the formation of an uncured porous gel. After the uncured porous gel has traveled along the conveyor for a pre-determined crush time and at an appropriate environmental temperature, a cured polyurethane foam is dispensed from a roll over the partially cured polyurethane foam. The resulting composite is passed through a suitable compressive device, e.g., a pair of belts supported by rotating crushing rollers, the length of the belts being adjusted to effect the desired crush duration. Suitable means for slitting the polyurethane foam composite may be installed at a further point along the conveyor.

The composites of this invention are characterized by having at least alternate layers of flexible, densified polyurethane foam. Composites having layers of different densities can be employed where specialized properties are desired. The layers of polyurethane foam in the composites of this invention are permanent and tenaciously secured together, thereby enhancing the durability of the composite.

The process latitude afforded by this invention allows production of a wide variety of composite structures which can be tailored to the desired specification. For example, by varying the position and number of the densified layers, mattresses and cushions can be produced having the desired firmness. In addition to cushioning applications, the composites of this invention can be used for carpet backing and padding, door mats, automotive pedal covers, automotive padding, etc.

The following examples are presented to illustrate the invention more fully without any intention of being limited thereby. All parts and percentages are by weight unless otherwise specified.

EXAMPLE 1

Two flexible polyurethane foam formulations, identified as A and B, were prepared by admixing the following ingredients in the following proportions:

| Ingredients | Parts by Weight |
| --- | --- |
| Oxypropylated Glycerine (molecular weight 3,000) | 100.0 |
| Toluene Diisocyanate (80% 2,4- and 20% 2,6- isomer; 105 index) | 49.5 |
| Stannous Octoate | 0.25 |
| Triethylene Diamine | 0.10 |
| Water | 4.0 |
| Silicone Surfactant* | 1.5 |

*This silicone surfactant is a block copolymer of a dimethyl polysiloxane and a polyalkylene oxide. The polyalkylene oxide is a random linear copolymer consisting of 50 weight percent ethylene and 50 weight percent propylene oxides terminated with a butoxy group. The branched polysiloxane and each of the polyether blocks have a molecular weight of 1500 to 1800.

The resulting formulation were dispensed into two square boxes having side dimensions of 16 inches and a height of 8 inches. The room temperature was 75° F. and the reaction mixtures were at approximately the same temperature at the beginning of the pour. Each foam reached a height of 4 inches. The boxes were removed and the foams were then placed in contiguous relationship, one on top of the other. This composite was crushed in a hand press fitted with a 2-inch spacer. The crush time, i.e., the period of time elapsed between the completion of the rise of the uncured foams as evidenced by the appearance of health bubbles on the surface of the foam and the first application of pressure thereto to effect crushing, was 120 seconds for foam A and 90 seconds for foam B. The duration of the crush was 90 seconds. The resulting composite was placed in an oven and cured at 65° C. for 15 minutes to provide a polyurethane foam composite comprising 2 layers having densified cores; the bond between the layers could not be broken. The densified portion of foam A had a density of 4.54 pounds per cubic foot; that of foam B had a density of 5.44 pounds per cubic foot.

EXAMPLE 2

Two flexible polyurethane foam formulations were prepared employing the same ingredients and proportions as described in Example 1. After rising to a height of 4 inches, each partially cured foam was crushed in a hand press fitted with a 1-inch spacer allowing a 90 second crush time at 75° F. After 30 seconds, the foams were removed from the press, and one foam was placed on top of the other. The foams had recovered slightly after removal from the press, and the composite was 2.2 inches high. The composite was then crushed to a height of 1 inch, allowing a crush time of 135 seconds at 75° F. with respect to each layer. After 90 seconds, the composite was removed from the press and heated in an oven at 65° C. for 15 minutes to complete the cure. The layers comprising the composite had the same appearance as those of Example 1; the densities of the densified portions were 8.05 and 9.23 pounds per cubic foot and the total height of the composite was 1.50 inches.

EXAMPLE 3

One polyurethane foam formulation was prepared employing the ingredients and proportions of the previous examples. Employing a crush time of 90 seconds at 75° F. and a crush duration of 90 seconds, the partially cured foam was crushed from 4 inches to 2 inches in a hand press, and then cured at 65° C. for 15 minutes in an oven.

A second polyurethane foam formulation employing the same ingredients and proportions as described above was prepared. The partially cured foam was crushed from 4 inches to 1 inch in a hand press allowing a 90 second crush time at 75° F. and a 30 second crush duration. This partially cured polyurethane foam was placed on top of the cured polyurethane foam described in the preceding paragraph. The composite was then crushed to 2 inches for 90 seconds in a hand press; the crush time with respect to the partially cured top layer was 120 seconds at 75° F. After curing in an oven for 15 minutes at 65° C. a composite comprising two layers having cores of densified polyurethane foam was obtained. The density of the core of the pre-cured layer was 5.89 pounds per cubic foot; the density of the core of the other layer was 5.16 pounds per cubic foot.

EXAMPLE 4

A cured 4 inch high free-rise polyurethane foam prepared as described in Example 3 was placed on top of a partially cured 4 inch high free-rise foam which was also prepared as described in the previous examples employing the same ingredients and proportions disclosed therein. Allowing a crush time of 90 seconds at 75° F. with respect to the partially cured bottom layer, the composite was placed in a hand press fitted with a 2-inch spacer. After 90 seconds, the composite was removed from the press and cured in an oven for 15 minutes at 65° C. the pre-cured foam layer returned to its original height of 4 inches and had a density of 1.70 pounds per cubic foot; the combined height of the cured composite was 5 inches. The density of the core of the 1 inch high layer was 6.67 pounds per cubic foot.

EXAMPLE 5

Two polyurethane foam formulations were prepared employing the same ingredients and proportions as the previous examples. One formulation was poured and allowed to cure to provide a flexible foam having a height of 4 inches. The second formulation was poured and then compressed to one inch in a hand press for 5 seconds allowing a crush time of 90 seconds at 75° F. The cured foam was placed on top of the partially cured pre-crushed foam and the composite crushed together in a hand press fitted with a 2-inch spacer for 90 seconds. The crush time with respect to the partially cured pre-crushed layer was 100 seconds at 75° F. After completing the cure by heating in an oven at 65° C. for 15 minutes, a composite comprising two layers having densified cores was obtained. The cured foam layer returned to its original height of 4 inches, and had a density of 1.59 pounds per cubic foot; the total height of the composite was 5 inches. The density of the core of the 1 inch high layer was 7.04 pounds per cubic foot.

EXAMPLE 6

A cured free-rise polyurethane foam was prepared employing the ingredients and proportions of the previous examples. This foam had a height of 4 inches.

A second polyurethane foam formulation was prepared by admixing the following ingredients in the following proportions.

| Ingredients | Parts by weight |
| --- | --- |
| Oxypropylated Glycerine (molecular weight 1,000) | 100.0 |
| Toluene Diisocyanate (80% 2,4- and 20% 2,6- isomer; 70 index) | 46.7 |
| Stannous Octoate | 0.20 |
| Triethylene Diamine | 0.10 |
| Water | 4.0 |
| Silicone Surfactant (as described in Example 1) | 1.5 |

This formulation was poured onto the cured polyurethane foam described in the previous paragraph. Allowing a crush time of 90 seconds at 75° F., the composite was crushed to a height of 2 ½ inches for 90 seconds. After completing the cure by heating at 65° C. in an oven for 15 minutes, a tenaciously bonded polyurethane foam composite was obtained. The layer consisting of the cured free-rise polyurethane foam returned to its original height of 4 inches and had a density of 1.63 pounds per cubic foot; the total height of the composite was 5 inches. The density of the core of the 1 inch high layer was 6.12 pounds per cubic foot.

EXAMPLE 7

Following the procedure of the previous examples, two polyurethane foam formulations were prepared by admixing the following ingredients in the following proportions.

| Ingredients | Parts by Weight | |
| --- | --- | --- |
| | A | B |
| Oxypropylated Glycerine (molecular weight 3,000) | | 100 |
| Oxypropylated Glycerine (molecular weight 1,000) | 100 | |
| Toluene Diisosyanate (80% 2,4- and 20% 2,6- isomer) | 46.7 | 49.5 |
| Stannous Octoate | .20 | .25 |
| Triethylene Diamine | .05 | .10 |
| Water | 4 | 4 |
| Silicone Surfactant (described in Example 1) | 1.5 | 1.5 |

Formulation A was poured and crushed from a free-rise height of 4 inches to 1 inch in a hand press allowing a 60 second crush time at 75° F. and a 60 second crush duration and then cured for 15 minutes in an oven at 65° C. Formulation B was poured, allowed to rise and then placed on top of the pre-crushed cured foam A and the composite placed in a hand press having a 2-inch spacer, allowing a 30 second crush time at 75° F. with respect to Formulation B. After 90 seconds, the composite was removed from the press and curing completed in an oven at 65° C. for 15 minutes. The final height of the composite was 2 inches. The core densities of the layers prepared from Formulations A and B were 4.23 and 4.96 pounds per cubic foot respectively.

EXAMPLE 8

A cured, free-rise polyurethane foam was made as described in Example 4. A second identical polyurethane foam formulation was poured onto the cured foam and the resulting composite crushed in a hand press fitted with a 2 ½-inch spacer. The crush time with respect to the poured formulation was 90 seconds at 75° F.; a crush duration of 90 seconds was employed. After removal of the crushed composite from the press, curing was completed by heating in an oven for 15 minutes at 65° C. The pre-cured, free-rise foam regained its original height of 4 inches and had a density of 1.62 pounds per cubic foot; the total height of the composite was 5 inches. The core density of the 1 inch high layer was 6.67 pounds per cubic foot.

EXAMPLE 9

A polyurethane foam formulation corresponding to Example 7, formulation A, was allowed to rise to a free-rise height of 4 inches and then crushed to 1 inch in a hand press for 30 seconds employing a crush time of 90 seconds at 75° F. Then a polyurethane foam formulation corresponding to that set forth in Example 7, formulation B, was poured onto the partially cured pre-crushed formulation. The resulting composite was placed in a hand press fitted with a 2-inch spacer, allowing, at 75° F., a 90 second crush time with respect to Formulation B and a 125 second crush time with respect to Formulation A. After 90 seconds, the composite was removed from the press and curing completed by heating in an oven at 65° C. for 15 minutes. The resulting composite had a height of 2 inches. The core densities of the layers prepared from Formulations A and B were 5.72 and 4.51 pounds per cubic foot respectively.

EXAMPLE 10

A pre-crushed, cured, free-rise polyurethane foam was prepared as described in Example 3, employing the same reactants and conditions. Then a polyurethane foam formulation comprising the same ingredients in the same proportions as the formulation employed to make the cured pre-crushed foam was poured onto the latter. The composite was placed in a hand press having a 2-inch spacer for 90 seconds; the crush time with respect to the freshly poured formulation was 90 seconds at 75° F. Curing of the composite was completed by heating in an oven for 15 minutes at 65° C. The core of the pre-crushed foam layer had a density of 5.30 pounds per cubic foot; that of the poured layer, a density of 5.09 pounds per cubic foot.

EXAMPLE 11

Three polyurethane foam formulations were prepared employing the following ingredients and proportions.

| Ingredients | Parts by Weight | | |
|---|---|---|---|
| | A | B | C |
| Oxypropylated Glycerine (molecular weight 3000) | 100.0 | 100.0 | 100.0 |
| Toluene Diisocyanate (80% 2,4- and 20% 2,6- isomer; 105 index) | 53.37 | 49.5 | 49.5 |
| Stannous Octoate | 0.35 | 0.25 | 0.25 |
| Triethylene Diamine | 0.10 | 0.10 | 0.10 |
| Water | 2.8 | 4.0 | 4.0 |
| Silicone Surfactant (described in Example 1) | 1.5 | 1.5 | 1.5 |

Each formulation was dispensed into a box as described in Example 1 and crushed from an original height of 4 inches to 1 inch employing a crush time of 90 seconds at 75° F. and a crush duration of 30 seconds. The partially-cured, crushed foam A was placed between foam B and foam C and the composite crushed to 2 ½ inches for 90 seconds at 75° F., employing a crush time of 135 seconds with respect to A, B and C. After removal from the press, the composite was cured at 65° C. for 15 minutes; the final height was 2 ½ inches. The core densities of the layers prepared from Formulations A, B and C were 5.55, 13.31 and 5.51 pounds per cubic foot respectively.

EXAMPLE 12

Three polyurethane foam formulations were prepared as in Example 11. After completion of the rise, foams A and B were placed in a contiguous relationship and the composite crushed to a height of 2 inches for 30 seconds, employing a crush time of 90 seconds. Formulation C was then allowed to rise, placed on top of the layers prepared from Formulations A and B, and the three layered composite crushed to three inches for 90 seconds at 75° F. The crush time for the composite was 90 seconds with respect to Formulation C and 125 seconds with respect to A and B. The resulting product was cured at 65° C. for 15 minutes to provide a composite having a height of 1.5 inches. The core densities of the layers prepared from Formulations A, B and C were 4.17, 4.35 and 21.00 pounds per cubic foot respectively; the heights of these layers were 1.8, 0.3 and 1.4 inches respectively.

EXAMPLE 13

Two polyurethane foam formulations were prepared following the procedure and employing the ingredients described in Example 1 except that 0.22 parts of stannous octoate were employed in the formulation. One formulation was poured and allowed to rise. 35 seconds after completion of the rise, the second formulation was poured onto the first. The resulting composite was placed in a hand press fitted with a two-inch spacer and allowed to remain for 90 seconds. The crush time at 75° F. for the composite was 90 seconds with respect to the second formulation and 125 seconds with respect to the first formulation. Curing was completed by heating at 65° C. for 15 minutes. The core densities of the layers prepared from the first and second formulations were 4.70 and 6.68 pounds per cubic foot respectively; the heights of the layers were 0.8 and 1.7 inches respectively.

EXAMPLE 14

A rigid polyurethane foam was made employing the following ingredients and the following proportions.

| Ingredients | Parts by Weight |
|---|---|
| An oxypropylated mixture of methyl glucoside and glycerine having a molecular weight of 490 | 100.0 |
| Siloxane-oxyalkylene block copolymer | 2.0 |
| 1,1,3,3-Tetramethylbutanediamine | 2.5 |
| Trichloromonofluoromethane | 32.0 |
| Polyphenylene polymethylene isocyanate | 111.0 |

A flexible polyurethane foam formulation employing the same ingredients and the same proportions as described in Example 1 was poured on top of a 1 inch high slice of the previously described rigid polyurethane foam and allowed to rise to its free-rise height of 4 inches. The resulting composite was crushed in a hand press fitted with a 2-inch spacer employing a crush time of 35 seconds at 75° F. with respect to the flexible polyurethane formulation. After 90 seconds, the composite was removed from the press and curing completed by heating in an oven for 15 minutes at 65° C. The final composite had a height of 2 inches. The 1 inch high rigid foam layer had a density of 2.10 pounds per cubic foot; the core density of the flexible foam layer was 4.63 pounds per cubic foot.

What is claimed is:

1. A method for making a polyurethane foam composite having a plurality of bonded layers and characterized by at least one layer of flexible, densified polyurethane foam which method consists essentially of
   a. placing a plurality of layers of polyurethane foam, including at least alternate layers of partially cured polyurethane foam, in contiguous relationship, thereby forming a composite structure,
   b. applying a compressive force to said composite structure at a period of time between about 0 and about 10 minutes after completion of the rise of said partially cured polyurethane foam, thereby reducing the volume of said partially cured polyurethane foam to between about two-thirds and about one-tenth of its original volume, the direction of said compressive force being substantially perpendicular to the boundary lines between the layers, and
   c. removing the compressive force and completing the cure of the composite polyurethane foam
with the provisio that
   where the period of time between completion of the rise and application of the compressive force is between about 0 and about 2.5 minutes, the partially cured polyurethane foam is maintained at an environmental temperature between about 45° and about 400° F. for said period;
   where said period of time is between about 2.5 and about 5 minutes, the partially cured polyurethane foam is maintained at an environmental temperature between about 45° and about 200° F. for said period; and
   where said period of time is between about 5 and about 10 minutes, the partially cured polyurethane foam is maintained at an environmental temperature between about 45° and 110° F. for said period.

2. The process of claim 1 wherein the partially cured polyurethane foam is maintained at an environmental temperature between about
   45° and about 200° F. where the period of time between completion of the rise and application of the compressive force is between about 0 and 2.5 minutes;
   45° and about 100° F. where said period of time is between about 2.5 and about 5 minutes; and
   45° and about 85° F. where said period of time is between about 5 and about 10 minutes.

3. The process of claim 1 wherein the compressive force is applied at a period of time between about 0 and about 10 minutes after completion of the rise of said partially cured polyurethane foam, and where said partially cured polyurethane foam is maintained at an environmental temperature between about 70° and about 110° F. for said period.

4. The process of claim 1 wherein the polyol employed in the preparation of said partially cured polyurethane foam is a polyether polyol.

5. The process of claim 4 wherein said polyether polyol is an oxyalkylated polyhydric alcohol having a molecular weight in the range between about 700 and about 10,000.

6. The process of claim 5 wherein said polyether polyol is oxypropylated glycerin.

7. The process of claim 4 wherein the foaming agent employed in the preparation of said partially cured polyurethane foam is water.

8. The process of claim 7 wherein the reaction catalyst employed in the preparation of said partially cured polyurethane foam is a mixture of an amine and a stannous salt.

9. The process of claim 4 wherein the foaming agent employed in the preparation of said partially cured polyurethane foam is a mixture of water and an organic foaming agent.

10. The process of claim 9 wherein the reaction catalyst employed in the preparation of said partially cured polyurethane foam is a mixture of an amine and a stannous salt.

11. The process of claim 1 wherein said partially cured polyurethane foam comprises oxypropylated glycerin having a molecular weight in the range between about 1,000 and about 6,000, toluene diisocyanate, water and a mixture of an amine and a stannous salt.

12. The process of claim 1 wherein a plurality of partially cured polyurethane foams are allowed to rise and subsequently placed in contiguous relationship to form the composite structure prior to the application of the compressive force.

* * * * *